United States Patent [19]
Smart et al.

[11] Patent Number: 5,933,665
[45] Date of Patent: Aug. 3, 1999

[54] FILM ADVANCE MECHANISM FOR CAMERA

[75] Inventors: David C. Smart, Fairport; Thomas E. Dussinger, Henrietta, both of N.Y.

[73] Assignee: Eastman Kodak Company, Rochester, N.Y.

[21] Appl. No.: 09/007,149

[22] Filed: Jan. 15, 1998

[51] Int. Cl.$^6$ .............................. G03B 17/04; G03B 1/00
[52] U.S. Cl. .......................... 396/348; 396/411; 396/416; 396/448
[58] Field of Search ...................................... 396/348, 401, 396/411, 416, 448

[56] References Cited

U.S. PATENT DOCUMENTS

| | | | |
|---|---|---|---|
| 2,169,548 | 8/1939 | Zapp ........................................ | 396/401 |
| 3,741,097 | 6/1973 | Fukuda et al. .......................... | 396/411 |
| 4,032,940 | 6/1977 | Chan ....................................... | 396/348 |
| 4,104,664 | 8/1978 | Winkler et al. ......................... | 396/400 |
| 4,227,789 | 10/1980 | Driscoll et al. ........................ | 396/387 |
| 5,765,066 | 6/1998 | Balling et al. .......................... | 396/411 |
| 5,794,089 | 8/1998 | Dussinger et al. ..................... | 396/348 |

Primary Examiner—Eddie C. Lee
Attorney, Agent, or Firm—Roger A. Fields

[57] ABSTRACT

A camera comprising a slide manually movable in forward and reverse directions, and a spool drive device connectable with a film spool for rotation in a winding direction to similarly rotate the film spool, is characterized in that the slide and the spool drive device are engaged with each other at a first location, to rotate the spool drive device in the winding direction, and simultaneously slip in contact with each other at an opposite location, to not interfere with rotation of the spool drive device in the winding direction, when the slide is moved in the forward direction, and are engaged with each other at the opposite location, to rotate the spool drive device in the winding direction, and simultaneously slip in contact with each other at the first location, to not interfere with rotation of the spool drive device in the winding direction, when the slide is moved in the reverse direction, whereby a two-way drive coupling is created between the slide and the spool drive device.

10 Claims, 12 Drawing Sheets

FILM ADVANCE MECHANISM FOR CAMERA

CROSS REFERENCE TO RELATED APPLICATION

Reference is made to commonly assigned copending application Ser. No. 08/832,147, entitled FILM ADVANCE MECHANISM FOR CAMERA and filed Apr. 2, 1997 in the names of Thomas E. Dussinger and David C. Smart, now U.S. Pat. No. 5,794,089.

FIELD OF THE INVENTION

The invention relates generally to the field of photography, and in particular to a film advance mechanism in a camera.

BACKGROUND OF THE INVENTION

Prior art U.S. Pat. No. 4,104,664 issued Aug. 1, 1978 discloses a camera in which a film advancing slide normally covers the housing of the camera. The slide is manually movable relative to the housing in forward and reverse directions, between a pulled-out extended position projecting from the housing to uncover the housing and a pushed-in retracted position against the housing to re-cover the housing. A take-up wheel in the housing is connectable to a film roll and, when connected, is drivingly rotated to wind successive exposed film frames onto the film roll following each exposure. A transmission and a one-way coupling are positioned between the slide and the take-up wheel to drivingly rotate the take-up wheel only when the slide is manually moved in the forward direction from the pushed-in position to the pulled-out position. Return of the slide in the reverse direction to its pushed-in position leaves the take-up wheel stationary.

As the exposed film frames are wound onto the film roll, the film roll incrementally increases in diameter. Thus, the film roll will not have to be rotated as much to take up a film frame later as compared to earlier when the film roll has only a few frames wound onto it. Since the take-up wheel is not drivingly rotated when the slide is returned to its pushed-in position, travel of the slide to its pulled-out position must be lengthy enough to wind a film frame onto the film roll earlier when the film roll is substantially empty and its diameter is relatively small. This significantly adds to the size of the camera.

THE CROSS-REFERENCED APPLICATION

The cross-referenced application discloses a camera in which a slide is manually movable in forward and reverse directions. A film drive gear is coupled with a film spool for rotation in a winding direction to similarly rotate the film spool, in order to wind an exposed filmstrip onto the film spool. A pair of rotation pinions are alternately movable into engagement with the film drive gear and separated from the film drive gear to take turns engaging the film drive gear to rotate the film drive gear in the winding direction. Respective racks are fixed to the slide and continuously engage the individual pinions to alternately move the two pinions into and out of engagement with the film drive gear and to rotate each pinion engaged with the film drive gear, when the slide is moved in the forward and reverse directions. Thus, a two-way coupling is created between the slide and the film drive gear vis-a-vis the engaged racks and pinions, which causes the film spool to be rotated to wind the exposed film onto the film spool when the slide is moved in the reverse direction as well as in the forward direction. Consequently, travel of the slide in each direction can be reduced as compared to the slide in prior art U.S. Pat. No. 4,104,664, and the camera can be made smaller.

SUMMARY OF THE INVENTION

A camera comprising a slide manually movable in forward and reverse directions, and a spool drive device connectable with a film spool for rotation in a winding direction to similarly rotate the film spool, is characterized in that:

the slide and the spool drive device are engaged with each other at a first location, to rotate the spool drive device in the winding direction, and simultaneously slip in contact with each other at an opposite location, to not interfere with rotation of the spool drive device in the winding direction, when the slide is moved in the forward direction, and are engaged with each other at the opposite location, to rotate the spool drive device in the winding direction, and simultaneously slip in contact with each other at the first location, to not interfere with rotation of the spool drive device in the winding direction, when the slide is moved in the reverse direction, whereby a two-way drive coupling is created between the slide and the spool drive device.

DETAILED DESCRIPTION OF THE INVENTION

Figure 1:
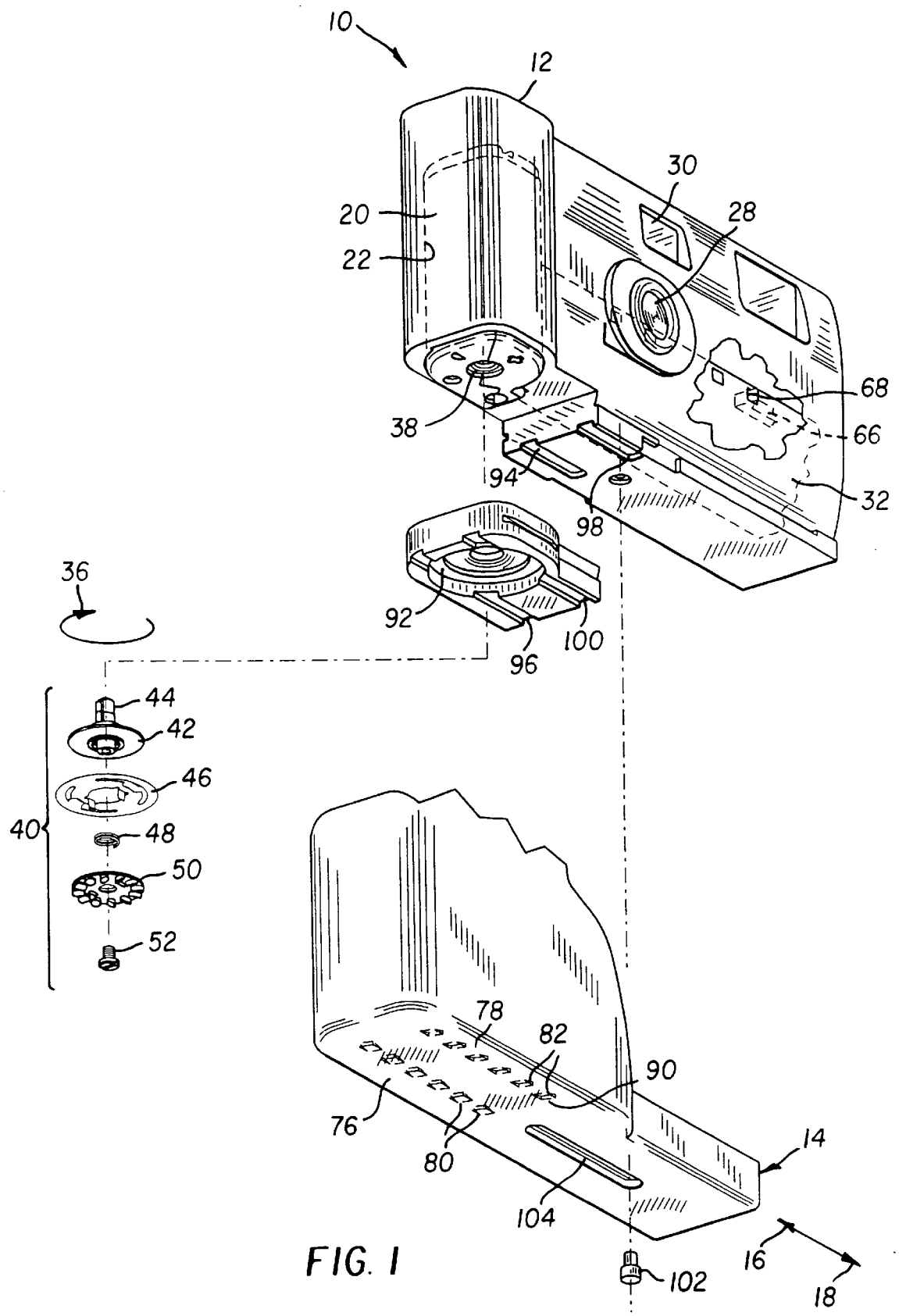
FIG. 1 is an exploded perspective view of a camera consistent with a preferred embodiment of the invention, as seen from the bottom up.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

BACKGROUND

Film and cameras that are all in one, commonly referred to as single-use or one-time-use cameras, have become well known. Typically, the known one-time-use camera is a simple point-and-shoot type comprising a plastic main body part which supports a film cartridge in a cartridge receiving chamber, a film take-up spool in a film supply chamber, a fixed-focus taking lens, a film metering mechanism with a rotatably supported metering sprocket that engages the filmstrip, a manually rotatable film advance thumbwheel rotatably engaged with a film spool inside the film cartridge, a single-blade shutter, a manually depressible shutter release button, a rotatable frame counter for indicating the number of exposures remaining for picture-taking, a direct see-through viewfinder, and in some models an electronic flash. A pair of opaque plastic front and rear cover parts house the main body part between them to complete the camera unit. The rear cover part connects to the main body part and/or to the front cover part to make the main body part light-tight. A decorative cardboard outer box or label at least partially contains the camera unit and has respective openings for the taking lens, the shutter release button, the film advance thumbwheel, the viewfinder, the frame counter, and a flash emission window for the electronic flash.

After each picture is taken with the one-time-use camera, the photographer manually rotates the thumbwheel in a film winding direction to rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer, and he forwards the used camera parts to the manufacturer for recycling, i.e. remanufacture.

THE PREFERRED EMBODIMENT

Referring now to the drawings, FIGS. 1–8 show a one-time-use camera 10 that has a film advancing mechanism which is different than in the typical one-time-use camera. The camera 10 comprises an exterior housing 12 and a cover slide 14 that is manually translatable relative to the housing in the indicated forward and reverse directions 16 and 18.

The housing 12 contains a known film cartridge 20 in a cartridge receiving chamber 22, an unexposed film roll 24 in a film roll chamber 26, a taking lens 28 and a viewfinder 30. Successive frames of a filmstrip 32 are exposed at a backframe opening 34 which is between the film cartridge 20 and the unexposed film roll 24 and behind the taking lens 24. After each exposure, when the film spool is rotated in a winding direction 36, the exposed film frame is wound onto a film spool 38 within the film cartridge 20 and a fresh unexposed frame is wound off the unexposed film roll 24.

Figure 5:
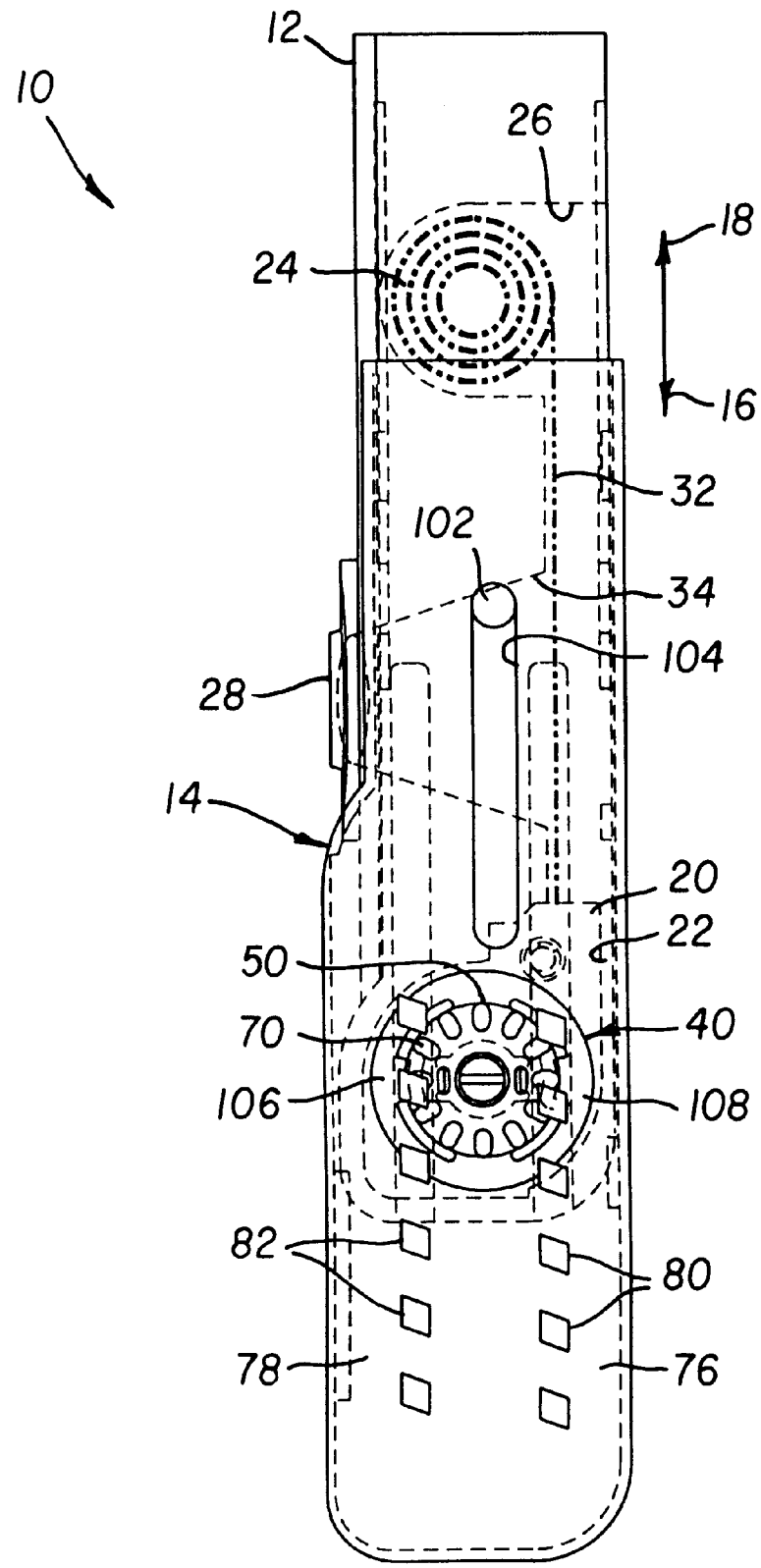
FIGS. 5 and 6 are bottom plan views of the camera depicting its operation.
Figure 6:
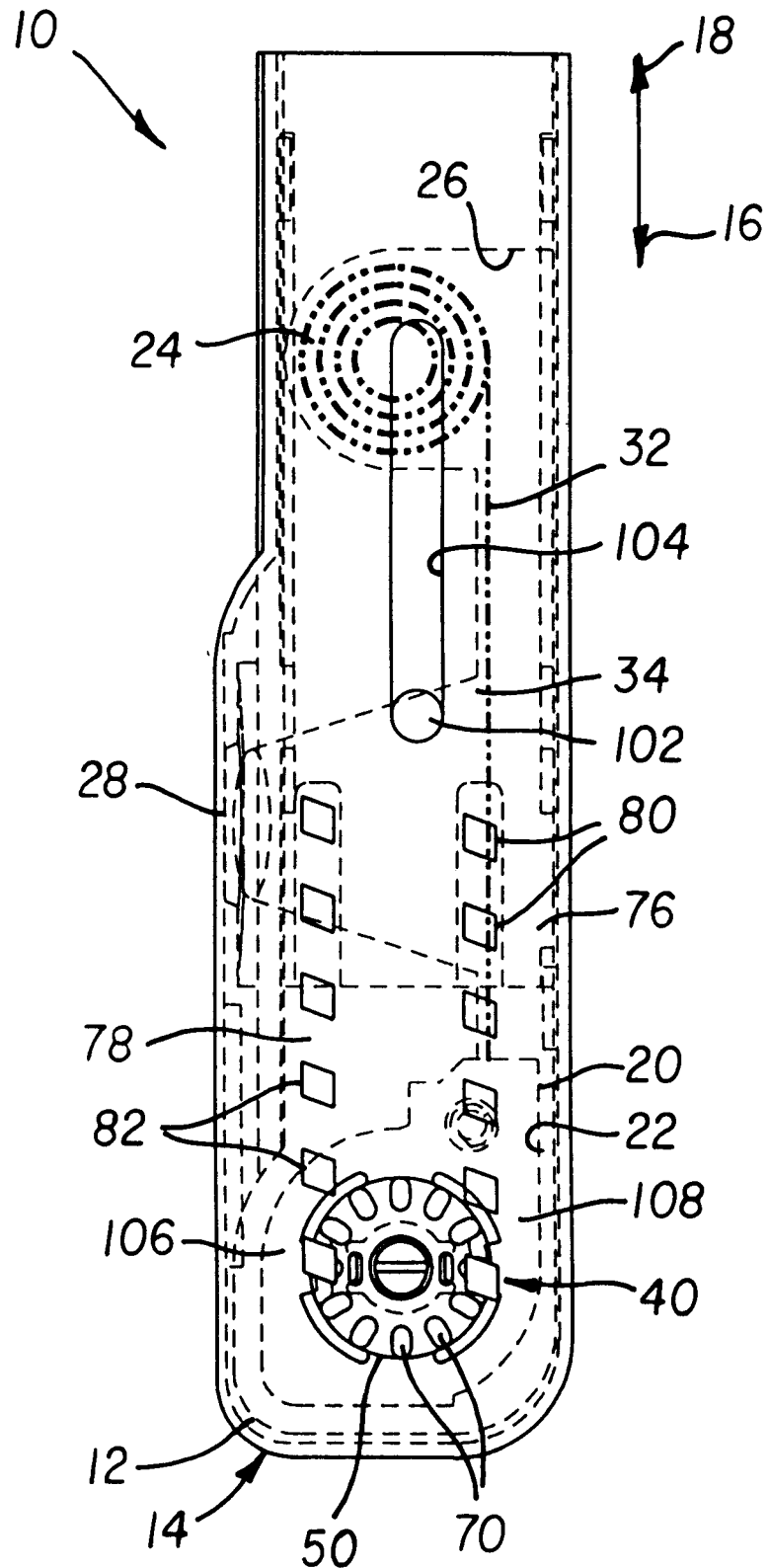
Figure 7:
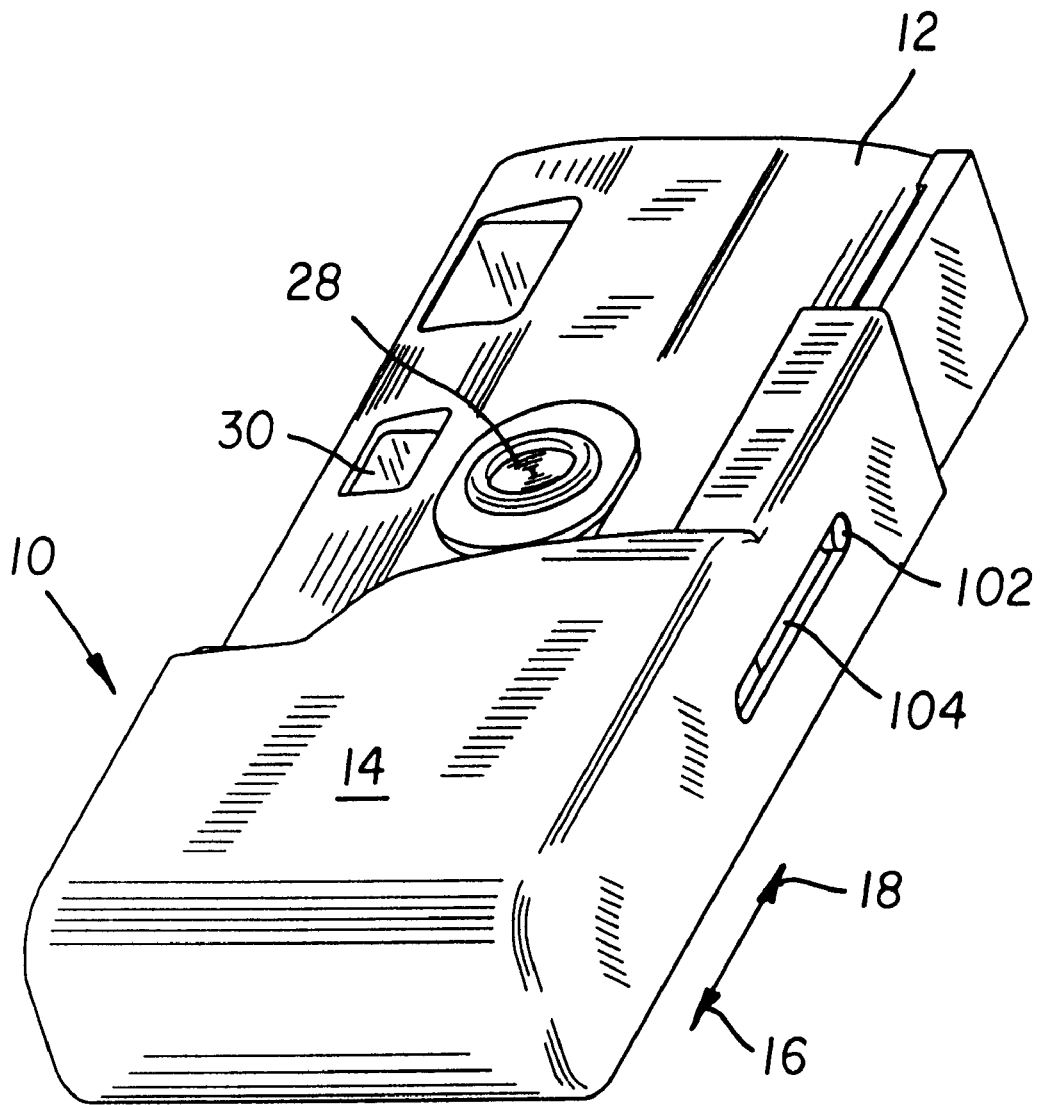
FIGS. 7 and 8 are front perspective views of the camera corresponding to FIGS. 5 and 6 respectively.
Figure 8:
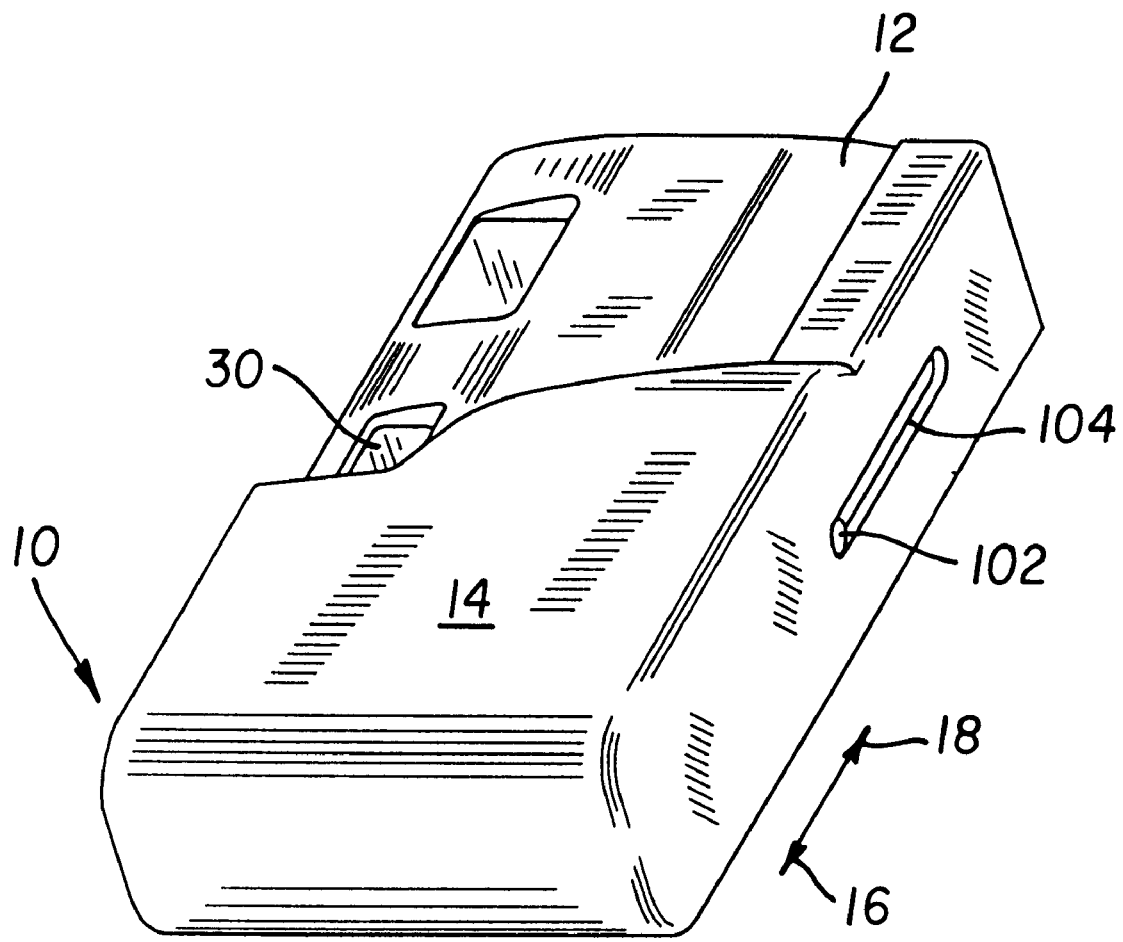
Figure 9:
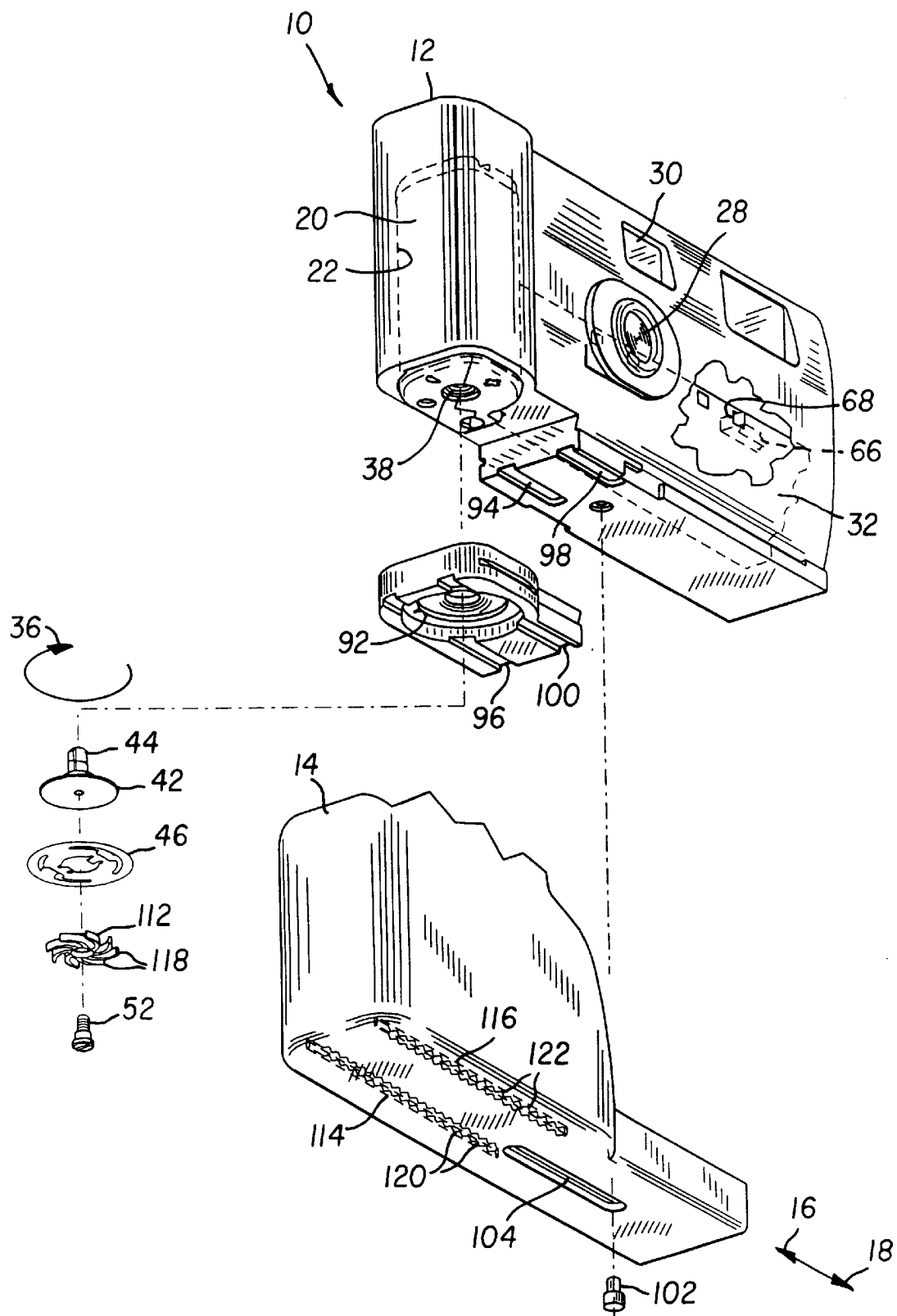
FIG. 9 is an exploded perspective view of a camera consistent with an alternative embodiment of the invention, as seen from the bottom up.
Figure 10:
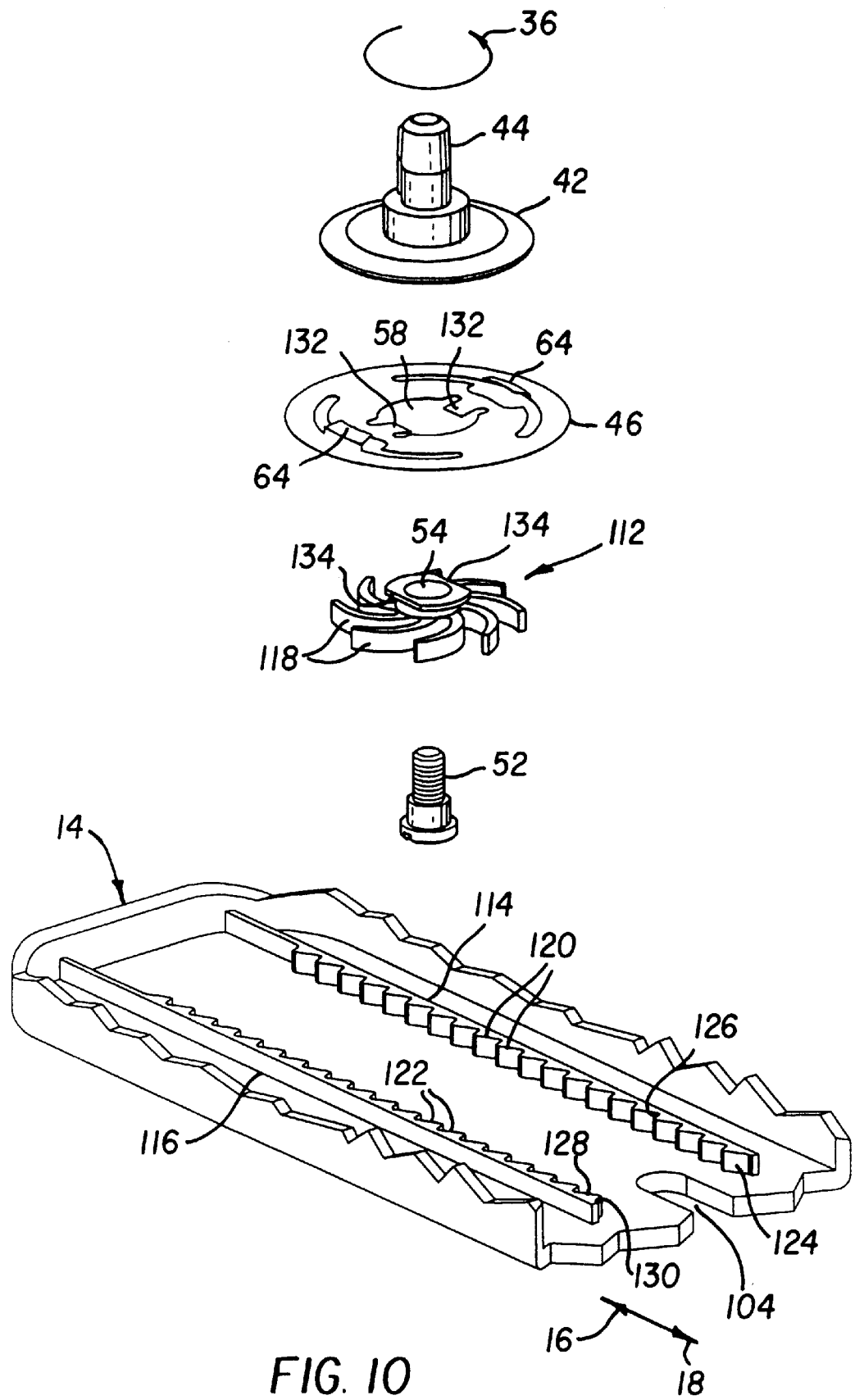
FIG. 10 is a partial enlarged view of FIG. 9 as seen from the top down.
Figure 11:
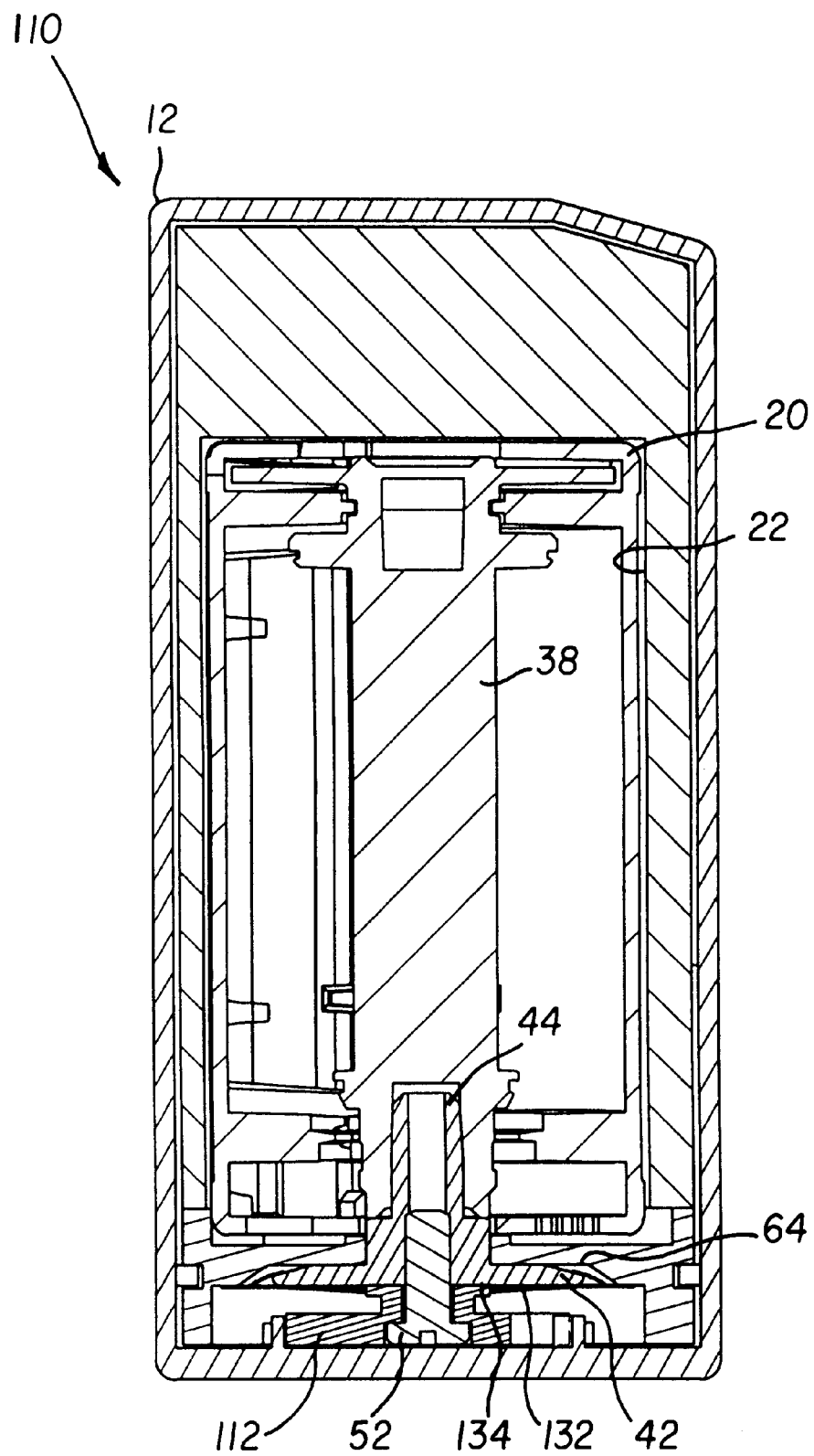
FIG. 11 is a section end view of the camera.

The cover slide 14 is intended to partially cover the housing 12, including the taking lens 24 and about one-half of the viewfinder 30, when the camera 10 is not being used, and is manually translated relative to the housing in the forward and reverse directions 16 and 18, as shown in FIGS. 5–8, between a pulled-out extended position projecting from the housing to uncover the taking lens 28 and the viewfinder 30, and a pushed-in retracted position against the housing to re-cover the taking lens and about one-half of the viewfinder. FIGS. 5 and 7 show the cover slide 14 in its pulled-out position, removed from in front of the taking lens 28 and the viewfinder 30. FIGS. 6 and 8 show the cover slide 14 in its pushed-in position, re-covering the taking lens 28 and about one-half of the viewfinder 30.

A spool drive device 40, shown in FIGS. 1–4, comprises an integral disc 42 and drive pin 44 that is coaxially engaged with the film spool 38 inside the film cartridge 20, a slip clutch 46, a helical compression spring 48, a rotation pinion 50, and a fastening screw 52 that extends through larger-diameter center holes 54, 56 and 58 in the pinion, the spring and the slip clutch and is partially threaded into a screw-hole (not shown) in the integral disc and drive pin. The slip clutch 46 includes a pair of parallel depending tangs 60, 60 that fit into respective parallel holes 62, 62 in the pinion 50 to coaxially fix the slip clutch and the pinion together, and it includes a pair of upstanding retaining tabs 64, 64 that are bent around the peripheral edge of the disc 42 to hold the disk to the slip clutch, but to allow rotation of the pinion and the slip clutch relative to the integral disc 42 and drive pin 44. A known film metering pawl 66, shown in FIG. 1, (or a known metering sprocket) is adapted to engage the filmstrip 32 at successive film perforations 68 to hold each film frame stationary during exposure at the backframe opening 34. If the metering pawl 66 is not engaged with the filmstrip 32, and the pinion 50 is rotated in the winding direction 36, the drive pin 44 will be similarly rotated in order to rotate the film spool 38 in the winding direction and wind the next exposed frame of the filmstrip onto the film spool. If the metering pawl 66 is engaged with the filmstrip 32, and the pinion 50 is rotated in the film winding direction 36, the disc 42 and the drive pin 44 cannot be rotated without tearing the filmstrip. Consequently, the pinion 50 and the slip clutch 46 are intended to be rotated relative to the disc 42 and the drive pin 44, thus leaving the film spool 38 stationary.

Figure 2:
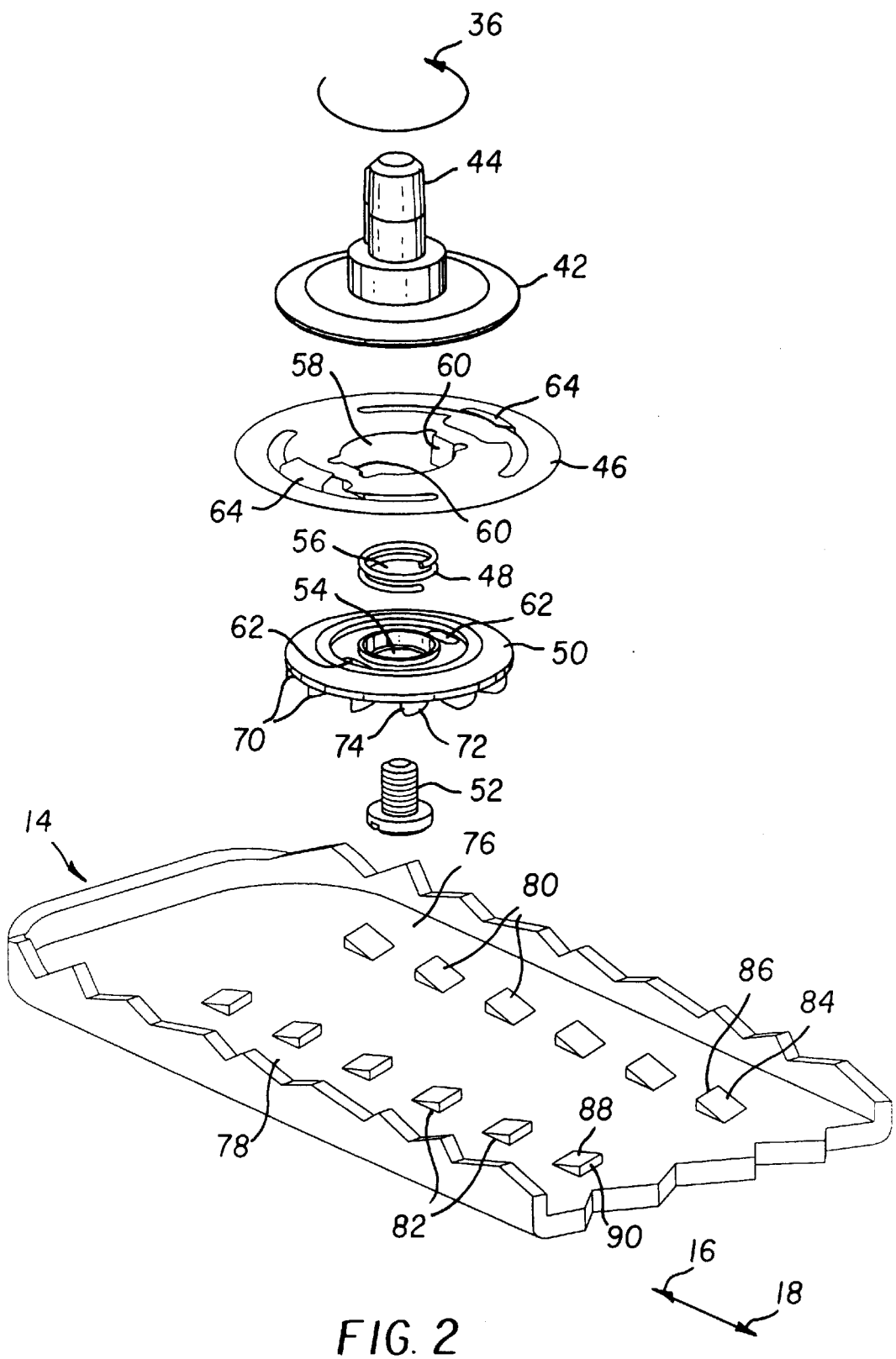
FIG. 2 is a partial enlarged view of FIG. 1 as seen from the top down.
Figure 3:
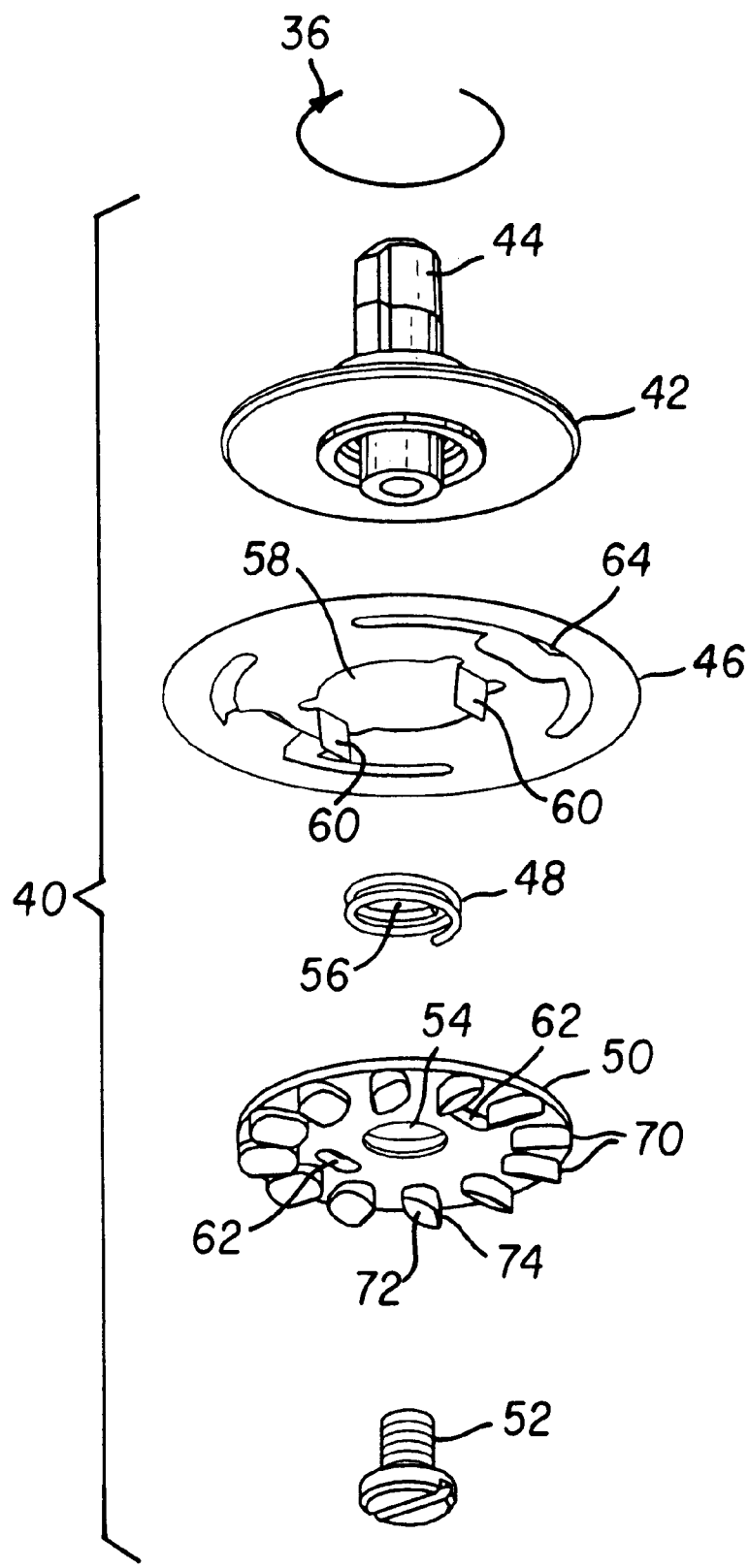
FIG. 3 is a partial enlarged view of FIG. 1 as seen from the bottom up.
Figure 4:
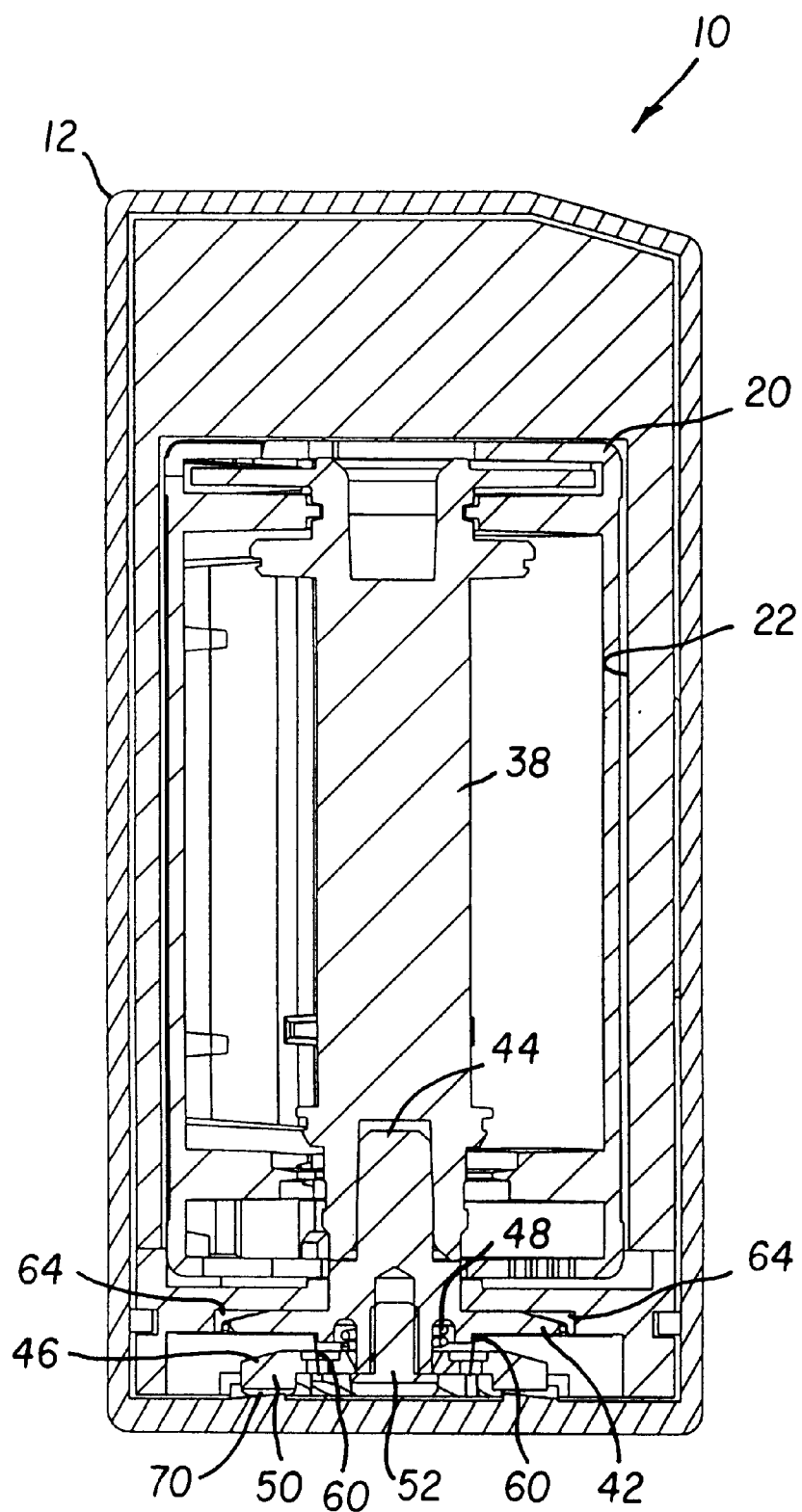
FIG. 4 is a section end view of the camera.

As shown in FIG. 3, the rotation pinion 50 has identically spaced twelve teeth 70 arranged in a circle on its underside. Each of the teeth 70 has an inclined slipping face 72 and a substantially vertical driven face 74. The cover slide 14 includes a pair of parallel racks 76 and 78, shown in FIGS. 1, 2 5 and 6. The rack 76 has six identically spaced teeth 80, and the rack 78 has six similarly spaced teeth 82. Each of the six teeth 80 has an inclined slipping face 84 and a substantially vertical driving face 86. Each of the six teeth 82 has an inclined slipping face 88 and a substantially vertical driving face 90. As shown in FIG. 2, the six inclined faces 84 substantially face in the reverse direction 18, and the six inclined faces 88 substantially face in the forward direction 16.

The spool drive device 40 is rotatably supported in a cavity 92, and the teeth 80 and 82 of the respective racks 76 and 78 are movable into and out of clearance slots 94, 96 and 98, 100 and to and from the teeth 70 of the pinion 50, when the cover slide 14 is manually translated in the forward and reverse directions 16 and 18. See FIG. 1. A fixed stop pin 102 within a slot 104 in the cover slide 14 limits translation of the cover slide in the forward and reverse directions 16 and 18.

OPERATION—PREFERRED EMBODIMENT

As shown in FIGS. 5–8, after each exposure the metering pawl 66 is disengaged from the filmstrip 32 at one of the film perforations 68 to release the exposed film frame at the backframe opening 34 and the cover slide 14 is manually translated first in the reverse direction 18 from its pulled-out extended position to its pushed-in retracted position and then in the forward direction 16 from its pushed-in retracted position to its pulled-out extended position.

When the cover slide 14 is translated in the reverse direction 18 from its pulled-out extended position to its pushed-in retracted position, the driving faces 90 of the six teeth 82 of the rack 78 successively engage and release the driven faces 74 of six consecutive teeth 70 of the rotation pinion 50 to rotate the spool drive device 40 in the winding direction 36, in order to similarly rotate the film spool 38 inside the film cartridge 20 and partially wind the exposed film frame onto the film spool. Simultaneously, the inclined slipping faces 84 of the six teeth 80 of the rack 76 successively slip in contact with the inclined slipping faces 72 of the next six teeth 70 of the pinion 50 to not prevent with rotation of the spool drive device 40 in the winding direction 36. As shown in FIG. 5, these engage/release and slipping actions take place at respective first and second locations 106 and 108 that are oppisite one another, i.e. 180° apart. The action of the inclined slipping faces 84 of the six teeth 80 of the rack 76 successively slipping in contact with the inclined slipping faces 72 of six teeth 70 of the pinion 50 at the location 106 is permitted because the pinion 50 can be tilted slightly in a counter-clockwise direction from that location, about the fastening screw 52, due to the presence of the compression spring 48 between the pinion and the slip clutch 46.

When the cover slide 14 is translated in the forward direction 16 from its pushed-in retracted position to its pulled-out extended position, the driving faces 86 of the six teeth 80 of the rack 76 successively engage and release the driven faces 74 of six consecutive teeth 70 of the rotation pinion 50 to rotate the spool drive device 40 in the winding direction 36, in order to similarly rotate the film spool 38 inside the film cartridge 20 and completely wind the exposed film frame onto the film spool. Simultaneously, the inclined slipping faces 88 of the six teeth 82 of the rack 78 successively slip in contact with the inclined slipping faces 72 of the next six teeth 70 of the pinion 50 to not prevent with rotation of the spool drive device 40 in the winding direction 36. As shown in FIG. 5, these engage/release and slipping actions take place at the opposite second and first locations 108 and 106. The action of the inclined slipping faces 88 of the six teeth 82 of the rack 78 successively slipping in contact with the inclined slipping faces 72 of six teeth 70 of the pinion 50 at the location 106 is permitted because the pinion 50 can be tilted slightly in a clockwise direction from that location, about the fastening screw 52, due to the presence of the compression spring 48 between the pinion and the slip clutch 46.

THE ALTERNATIVE EMBODIMENT

Referring now to the drawings, FIGS. 9–12 show a one-time-use camera 110 which is different than the one-time-use camera 10 in the construction of a rotatable pinion 112 instead of the rotatable pinion 50, an absence of the spring 48, and a pair of parallel racks 114 and 116 instead of with the racks 76 and 78. Thus, in FIGS. 9-12 most of the reference numbers are the same as in FIGS. 1–8.

The rotatable pinion 112 is substantially in the form of a pin wheel having eight elastic fingers 118 that are similarly curved to be more easily flexed in conformity with their curvature than against their curvature.

Figure 12:
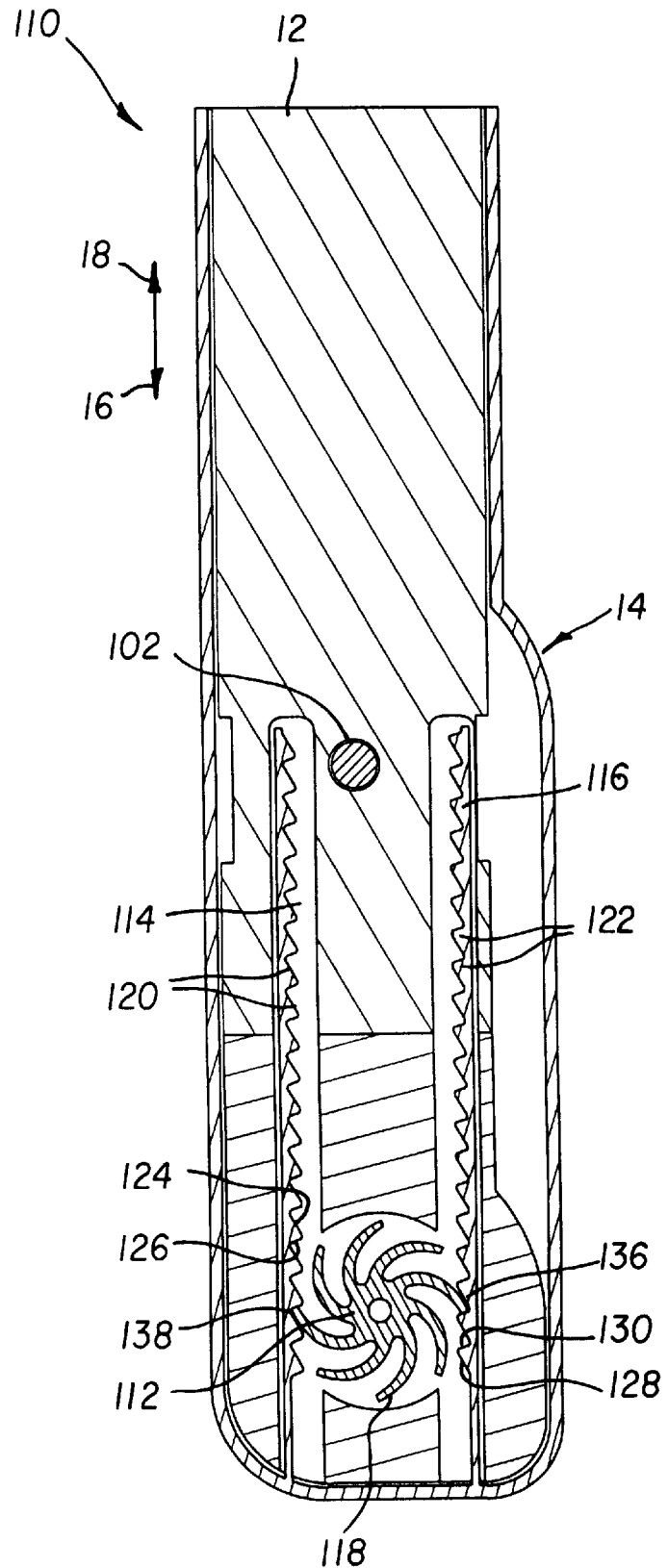
FIG. 12 is a section bottom plan view of the camera.

The rack 114 has a number of identically spaced teeth 120, and the rack 116 has the same number of similarly spaced teeth 122. Each of the teeth 120 has an inclined slipping face 124 and a substantially vertical driving face 126. Each of the teeth 122 has an inclined slipping face 128 and a substantially vertical driving face 130. As shown in FIG. 12, the inclined faces 124 substantially face in the reverse direction 18, and the inclined faces 128 substantially face in the forward direction 16.

The slip clutch 46 has a a pair of inclined tangs 132, 132 that press against respective flats 134, 134 of the rotation pinion 112 to coaxially fix the slip clutch to the rotation pinion. This is in place of the depending tabs 60, 60 of the slip clutch 46 and the holes 62, 62 in the rotation pinion 50.

OPERATION—ALTERNATIVE EMBODIMENT

As shown in FIGS. 9–12, after each exposure the metering pawl 66 is disengaged from the filmstrip 32 at one of the film perforations 68 to release the exposed film frame at the backframe opening 34 and the cover slide 14 is manually translated first in the reverse direction 18 from its pulled-out extended position to its pushed-in retracted position and then in the forward direction 16 from its pushed-in retracted position to its pulled-out extended position.

When the cover slide 14 is translated in the reverse direction 18 from its pulled-out extended position to its pushed-in retracted position, the driving faces 130 of the teeth 122 of the rack 116 successively engage and release the curved fingers 118 of the rotation pinion 112 to rotate the spool drive device 40 in the winding direction 36, in order to similarly rotate the film spool 38 inside the film cartridge 20 and partially wind the exposed film frame onto the film spool. Simultaneously, the inclined slipping faces 124 of the teeth 120 of the rack 114 successively slip in contact with the curved fingers 118 of the pinion 112 to not prevent rotation of the spool drive device 40 in the winding direction 36. As shown in FIG. 12, these engage/release and slipping actions take place at respective first and second locations 136 and 138 that are opposite one another, i.e. 180° apart.

When the cover slide 14 is translated in the forward direction 16 from its pushed-in retracted position to its pulled-out extended position, the driving faces 126 of the teeth 120 of the rack 114 successively engage and release the curved fingers 118 of the rotation pinion 112 to rotate the spool drive device 40 in the winding direction 36, in order to similarly rotate the film spool 38 inside the film cartridge 20 and partially wind the exposed film frame onto the film spool. Simultaneously, the inclined slipping faces 128 of the teeth 122 of the rack 116 successively slip in contact with the curved fingers 118 of the pinion 112 to not prevent rotation of the spool drive device 40 in the winding direction 36. As shown in FIG. 12, these engage/release and slipping actions take place at the opposite second and first locations 138 and 136.

The invention has been described with reference to a preferred embodiment. However, it will be appreciated that variations and modifications can be effected by a person of ordinary skill in the art without departing from the scope of the invention.

PARTS LIST 10. camera
12. housing
14. cover slide
16. forward direction
18. reverse direction 20. film cartridge
22. cartridge receiving chamber
24. unexposed film roll
26. film roll chamber
28. taking lens
30. viewfinder
32. filmstrip
34. backframe opening
36. winding direction
38. film spool
40. spool drive device
42. disc
44. drive pin
46. slip clutch
48. compression spring
50. rotation pinion
52. fastening screw
54. center hole
56. center hole
58. center hole
60. tangs
62. holes
64. tabs
66. metering pawl
68. film perforations
70. teeth
72. slipping faces
74. driven faces
76. rack
78. rack
80. teeth
82. teeth
84. slipping faces
86. driving faces
88. slipping faces
90. driving faces
92. cavity
94. slot
96. slot
98. slot
100. slot
102. stop pin
104. slot
106. location
108. location
110. camera
112. rotatable pinion
114. rack
116. rack
118. elastic fingers
120. teeth
122. teeth
124. slipping faces
126. driving faces
128. slipping faces
130. driving faces
132. tangs
134. flats
136. location
138. location

What is claimed is:

1. A camera comprising a slide manually movable in forward and reverse directions, and a spool drive device connectable with a film spool for rotation in a winding direction to similarly rotate the film spool, is characterized in that:

said slide and said spool drive device are engaged with each other at a first location, to rotate the spool drive device in the winding direction, and simultaneously slip in contact with each other at a second location that is opposite said first location, to not prevent rotation of the spool drive device in the winding direction, when the slide is moved in the forward direction, and are engaged with each other at said second location, to rotate the spool drive device in the winding direction, and simultaneously slip in contact with each other at said first location, to not prevent rotation of the spool drive device in the winding direction, when the slide is moved in the reverse direction, whereby a two-way drive coupling is created between said slide and said spool drive device.

2. A camera as recited in claim 1, wherein said slide includes a pair of parallel racks which move alongside said first and second opposite locations when the slide is moved in the forward and reverse directions, and said spool drive device includes a single coaxial pinion positioned adjacent each of said racks to engage and simultaneously slip in contact with the respective racks at the first and second opposite locations and alternately at the second and first opposite locations according to whether the slide is moved in the forward or reverse direction.

3. A camera as recited in claim 2, wherein each of said racks has teeth with engaging faces to successively engage said single pinion to rotate the single pinion in the winding direction when said slide is moved in one of the forward and reverse directions and with inclined faces to successively slip in contact with the single pinion when the slide is moved in the other of the forward and reverse directions.

4. A camera as recited in claim 2, wherein said single pinion is tiltable to be able to take turns slipping in contact with said respective racks according to whether the slide is moved in the forward or reverse direction.

5. A camera as recited in claim 4, wherein each of said racks has at least one inclined face for tilting said single pinion according to whether the slide is moved in the forward or reverse direction.

6. A camera as recited in claim 4, wherein one of said racks tilts said single pinion in one direction from said first location to slip in contact with the single pinion at the first location and another of said racks tilts said single pinion in another direction from said second location to slip in contact with the single pinion at the second location according to whether the slide is moved in the forward or reverse direction.

7. A camera as recited in claim 4, wherein a spring urges said single pinion to adjacent each of said racks to be engaged with one of the racks and to be tilted to simultaneously slip in contact with the other rack.

8. A camera as recited in claim 2, wherein said single pinion is elastic to be able to take turns slipping in contact with said respective racks.

9. A camera as recited in claim 2, wherein said single pinion is a pin wheel having elastic fingers that are similarly curved to be more easily flexed in conformity with their curvature than against their curvature for the single pinion to be able to take turns slipping in contact with said respective racks.

10. A camera as recited in claim 9, wherein said respective racks have teeth that point toward one another, and said elastic fingers are positioned between the two racks.

* * * * *